United States Patent
Lee et al.

(10) Patent No.: US 10,367,395 B2
(45) Date of Patent: Jul. 30, 2019

(54) GLOCKENSPIEL POWER GENERATOR

(71) Applicants: Edward EnChow Lee, Fremont, CA (US); Marco A. V. Bitetto, Rensselaer, NY (US)

(72) Inventors: Edward EnChow Lee, Fremont, CA (US); Marco A. V. Bitetto, Rensselaer, NY (US)

( * ) Notice: Subject to any disclaimer, the term of this patent is extended or adjusted under 35 U.S.C. 154(b) by 0 days.

(21) Appl. No.: 16/211,018

(22) Filed: Dec. 5, 2018

(65) Prior Publication Data

US 2019/0173357 A1    Jun. 6, 2019

Related U.S. Application Data

(60) Provisional application No. 62/594,970, filed on Dec. 5, 2017.

(51) Int. Cl.
| | |
|---|---|
| *H02K 7/18* | (2006.01) |
| *H02K 7/10* | (2006.01) |
| *H02K 7/116* | (2006.01) |
| *H02J 7/00* | (2006.01) |
| *H02K 5/04* | (2006.01) |

(52) U.S. Cl.
CPC .......... *H02K 7/1853* (2013.01); *H02J 7/0042* (2013.01); *H02K 5/04* (2013.01); *H02K 7/116* (2013.01)

(58) Field of Classification Search
CPC ...... H02K 7/1853; H02K 7/116; H02K 99/10; H02J 7/0042; H02N 11/002
USPC .... 310/75 B, 75 A, 75 R; 290/1 A, 1 C, 1 E, 290/1 R; 185/10-12, 38-39; 322/17, 38, 322/51
See application file for complete search history.

(56) References Cited

U.S. PATENT DOCUMENTS

| | | | | |
|---|---|---|---|---|
| 2,282,963 A | * | 5/1942 | Haynes | H02K 7/1853 185/40 R |
| 2,393,813 A | * | 1/1946 | Roggan | H02K 7/1861 310/75 B |
| 3,675,113 A | * | 7/1972 | Bader | F03G 1/00 185/38 |
| 4,332,006 A | * | 5/1982 | Choe | F21S 9/04 362/193 |
| 4,360,860 A | * | 11/1982 | Johnson | F21L 13/06 320/123 |

(Continued)

FOREIGN PATENT DOCUMENTS

GB    2299457    * 10/1996    ......... H02K 7/18

*Primary Examiner* — Burton S Mullins (57) ABSTRACT

A power generator that enables electrical power generation from a cranking motion and subsequently transmits that energy to mobile devices, vehicles, or other electrically-powered items. The power generator includes a cranking mechanism, a casing, at least one energy-converting mechanism and a charging output. The cranking mechanism allows the user to input mechanical energy to the power generator. The casing conceals and protects the internal components of the power generator. The at least one energy-converting mechanism allows the power generator to convert mechanical energy, produced by the cranking mechanism, into electrical energy. The charging output allows the power generator to transfer the electrical energy, produced by the at least one energy-converting mechanism, to any device that runs on electricity such as, but not limited to, a mobile device or vehicle.

19 Claims, 7 Drawing Sheets

(56) References Cited

U.S. PATENT DOCUMENTS

| | | | | |
|---|---|---|---|---|
| 6,690,141 B1* | 2/2004 | Yu | ............... | H01M 10/46 |
| | | | | 320/107 |
| 6,880,677 B2* | 4/2005 | Chio | ............... | F03G 1/02 |
| | | | | 185/10 |
| 7,276,805 B2* | 10/2007 | Poon | ............... | F21L 13/06 |
| | | | | 290/1 C |
| 7,626,279 B2* | 12/2009 | Brown | ............... | F03G 7/08 |
| | | | | 290/1 R |
| 7,723,880 B2* | 5/2010 | Dai | ............... | H02K 7/1861 |
| | | | | 290/1 R |
| 8,083,032 B2* | 12/2011 | Hasegawa | ............... | F03G 1/08 |
| | | | | 185/39 |
| 8,813,915 B2* | 8/2014 | Chio | ............... | F03G 1/02 |
| | | | | 185/10 |
| 2014/0152019 A1* | 6/2014 | Voorhees | ............... | H02K 7/1853 |
| | | | | 290/1 E |
| 2017/0373560 A1* | 12/2017 | Sharkas | ............... | H02K 7/1853 |

* cited by examiner

GLOCKENSPIEL POWER GENERATOR

The current application claims a priority to the U.S. Provisional Patent application Ser. No. 62/594,970 filed on Dec. 5, 2017.

FIELD OF THE INVENTION

The present invention relates generally to an electrical generator. More specifically, the present invention provides a power generator that enables electrical power generation from cranking motion and subsequently transmits that energy to a cord through inductive magnetic coupling to mobile devices, vehicles, or other electrically-powered items.

BACKGROUND OF THE INVENTION

The advent of electrical devices, in diverse and varied applications ranging from vehicle batteries to handheld devices, have enabled humans to communicate and mobilize in ways our ancestors could never have imagined. The omnipresence of these devices and various electrical application has been meteoric, resulting in an exponential increase in the efficiency of electrical element production, and the sheer volume of electrical components produced. The battery in particular enables the device to provide regulated electrical power to controllers, resistors, capacitors, and other common electrical components.

However, the battery has an inherent weakness. As the storage unit for electrical power, it is inherently limited in its capacity. While advances in selectively permeable membranes and semiconductor materials enable improvements in battery technology, the battery will always be the primary limiting factor of the usefulness of devices. To this end, the rechargeable battery has been developed. This battery not only stores electrical energy but also enables the user to provide an electrical stimulus that replenishes electrical energy to the battery when the battery is depleting or empty. Various supplemental technologies enable the user to interact with the battery to determine its fullness and thus to provide the battery with more charge as needed. However, now the primary battery issue becomes providing an electrical stimulus that can charge a battery as needed. While humans have the ability to generate mechanical power intuitively and with relative ease and efficiency, electrical power must be provided by power outlets connected to vast electrical networks, or by temporary batteries. Such devices are effective, but often inconvenient to use or to carry, resulting in the common occurrence of users panicking over low battery charge on their devices. What is needed is a handheld device that can convert mechanical energy from the user into electrical energy to be used by the device. Further desirable is a device which provides charging capabilities without requiring excessive, space-consuming, inconvenient wires and cables.

It is therefore an objective of the present invention to provide a power generator that is a handheld charger that is capable of connecting to any of a variety of different batteries for devices. A hand-crank key enables convenient and intuitive winding of a coil, which sets several dynamos in motion. These dynamos generate electrical power, which is transmitted magnetically through an inductive coil to a coil within a battery cable. This enables the present invention to function wirelessly, thus preventing users from finicking with long cables and cords. The battery cable receives and transmits the received energy to the battery. This system enables users to power their devices when they are not near electrical outlets, or when they have forgotten their cords, converters, or other previously required connectors.

DETAIL DESCRIPTIONS OF THE INVENTION

All illustrations of the drawings are for the purpose of describing selected versions of the present invention and are not intended to limit the scope of the present invention.

In reference to FIGS. 1 through 7, the present invention is a power generator that enables electrical power generation from a cranking motion and subsequently transmits that energy to mobile devices, vehicles, or other electrically-powered items. The present invention comprises a cranking mechanism 1, a casing 2, at least one energy-converting mechanism 3, and a charging output 4. The cranking mechanism 1 allows the user to input mechanical energy to the present invention. The casing 2 conceals and protects the internal components of the present invention. The at least one energy-converting mechanism 3 allows the present invention to convert mechanical energy, produced by the cranking mechanism 1, into electrical energy. The charging output 4 allows the present invention to transfer the electrical energy, produced by the at least one energy-converting mechanism 3, to any device that runs on electricity such as, but not limited to, a mobile device or vehicle.

The general configuration of the aforementioned components allows the power generator to effectively convert mechanical energy into electrical energy and transfer the electrical energy to any device such as, but not limited to, a mobile device or vehicle. In reference to FIGS. 1 through 4, the cranking mechanism 1 comprises a handle 11 and a drive shaft 12. The handle is a gripping element for the user to provide mechanical energy to the present invention. The drive shaft 12 is used to transmit mechanical energy that is inputted through the handle 11. The drive shaft 12 traverses into the casing 2 and is rotatably mounted to the casing 2. This arrangement allows the drive shaft 12 to still rotate while secured to the casing 2. In one embodiment of the present invention, the drive shaft 12 is rotatably mounted to the casing 2 using a ball bearing assembly which would allow the drive shaft 12 to freely rotate while still being secured to the casing 2. The handle 11 is positioned externally to the casing 2 and terminally and torsionally connected to the drive shaft 12. This arrangement allows the drive shaft 12 to receive mechanical energy through the cranking motion of the handle 11. The at least one energy-converting mechanism 3 comprises a spring 31, a sun gear 32, a plurality of planetary gears 33, and a plurality of dynamos 34. The spring 31 is used to store potential energy to be used as rotational mechanical energy. The sun gear 32 is used to transfer rotational mechanical energy from the spring 31 to the plurality of planetary gears 33, which in turn is used to transfer the rotational mechanical energy to the plurality of dynamos 34. The plurality of dynamos 34 converts the rotational mechanical energy into electrical energy. The spring 31 comprises a first spring end 311 and a second spring end 312. The first spring end 311 and the second spring end 312 distinguish the opposite ends of the spring 31. The at least one energy-converting mechanism 3 is mounted within the casing 2. This arrangement protects and conceals the at least one energy-converting mechanism 3. The first spring end 311 is terminally and torsionally connected to the drive shaft 12, opposite to the handle 11, and the second spring end is mounted within the casing 2. This arrangement allows the user to generate mechanical energy by cranking the handle 11, transmitting the mechanical energy to the drive shaft 12 which is stored as potential energy through the spring 31. The sun gear 32 is torsionally connected to the drive shaft 12. This arrangement allows the sun gear 32 to receive rotational energy through the drive shaft 12 from the unwinding of the spring 31. The plurality of planetary gears 33 is engaged around the sun gear 32, and each of the plurality of planetary gears 33 is torsionally connected to a corresponding dynamo from the plurality of dynamos 34. This arrangement allows the plurality of planetary gears 33 to receive rotational mechanical energy and effectively transmit said rotational mechanical energy to corresponding dynamo from the plurality of dynamos 34. The charging output 4 is electrically connected to the plurality of dynamos 34. This arrangement allows the charging output 4 to receive electrical energy from the plurality of dynamos 34 that can be transferred to any electrically-powered device.

Figure 3:
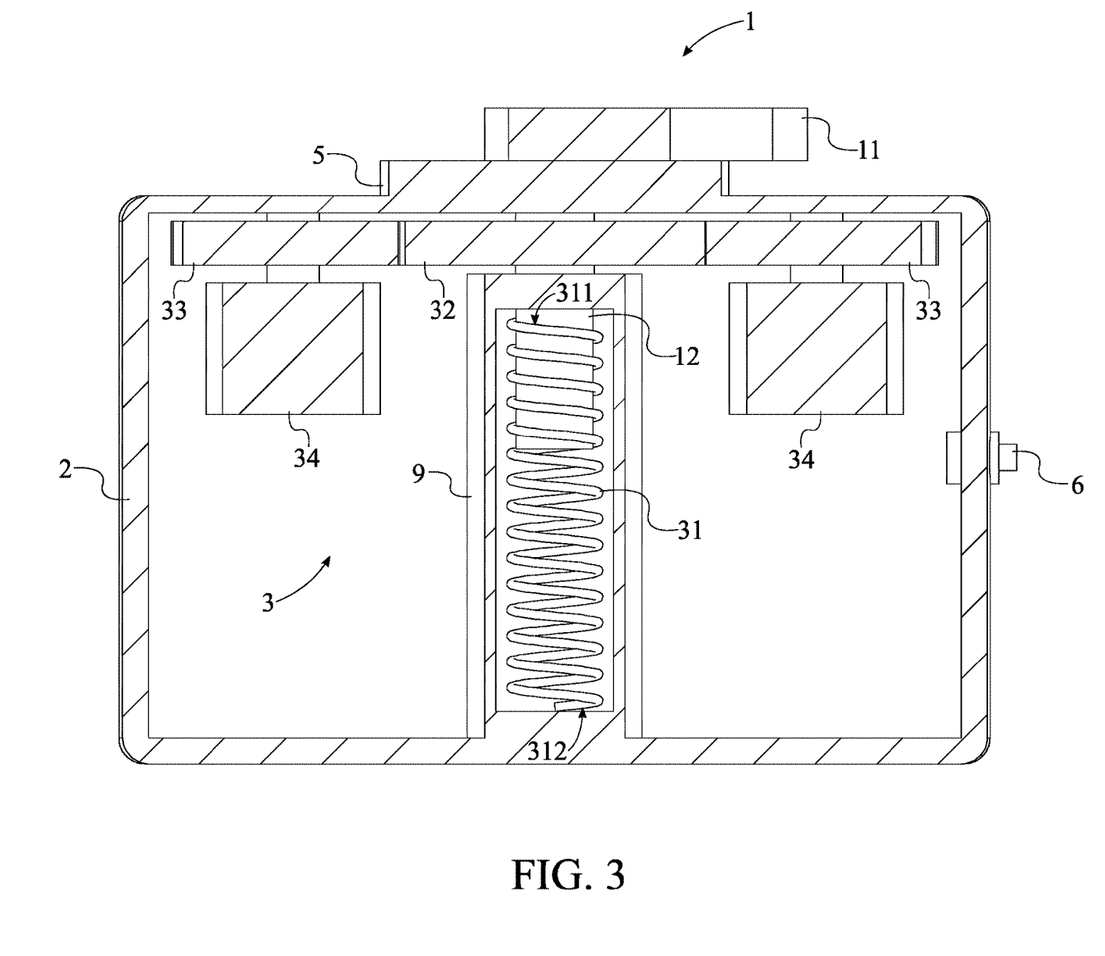
FIG. 3 is a cross-section view of section 3-3 from FIG. 2.
Figure 4:
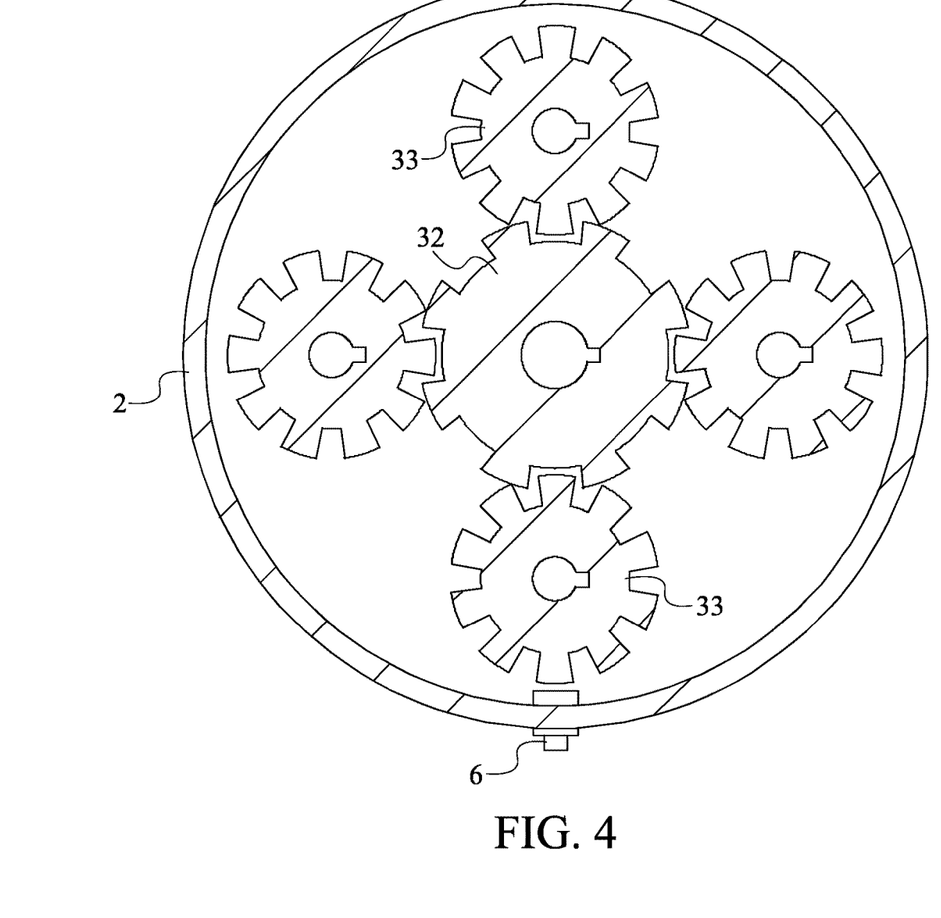
FIG. 4 is a cross-section view of section 4-4 from FIG. 2.

With reference to FIG. 3, the present invention further comprises a tubular housing 9. The tubular housing 9 is used to enclose the drive shaft 12 and the spring 31. The tubular housing 9 comprises a first closed end 91 and a second closed end 92. The first closed end 91 and the second closed end 92 distinguish ends of the tubular housing 9. The drive shaft 12 is hermetically traversed through the first closed end 91. This arrangement properly positions the drive shaft 12 to the tubular housing 9 and allows drive shaft 12 to function at the highest efficiency. The spring is positioned within the tubular housing 9. This arrangement properly positions the spring 31 and allows the spring 31 to function at the highest efficiency. Furthermore, the second spring end 312 is fixed to the second closed end 92, and the second closed end 92 is fixed to the casing 2. This arrangement allows the spring 31 to be properly and effectively wound by the drive shaft 12 through the cranking motion of the handle 11 in order to store potential energy. Moreover, the tubular housing 9 is centrally positioned to the casing to allow enough spatial area for the components of the at least one energy-converting mechanism 3. Additionally, the tubular housing 9 is a hermetically-sealed enclosure and said hermetically-sealed enclosure is a vacuum chamber. This allows the spring 31 and the drive shaft 12 to function at the highest efficiency by preventing any friction between air molecules and the spring 31 and the drive shaft 12.

Figure 1:
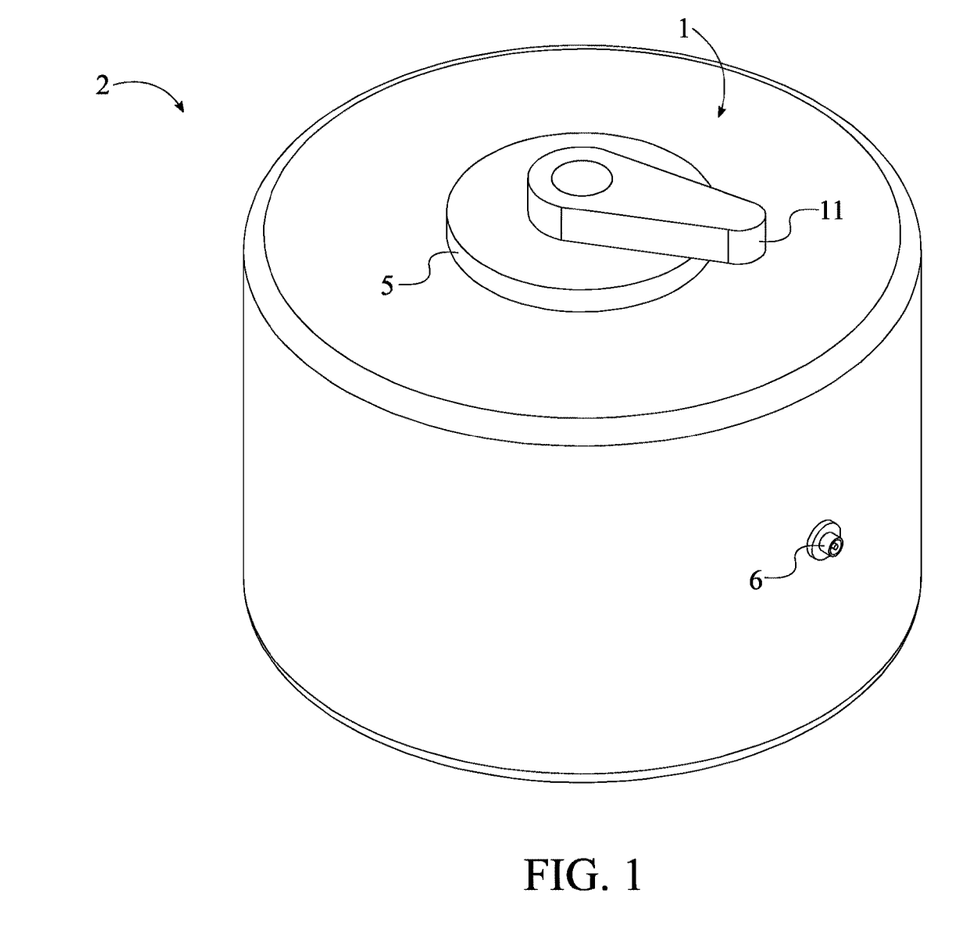
FIG. 1 is a perspective view of the first embodiment of the present invention.
Figure 2:
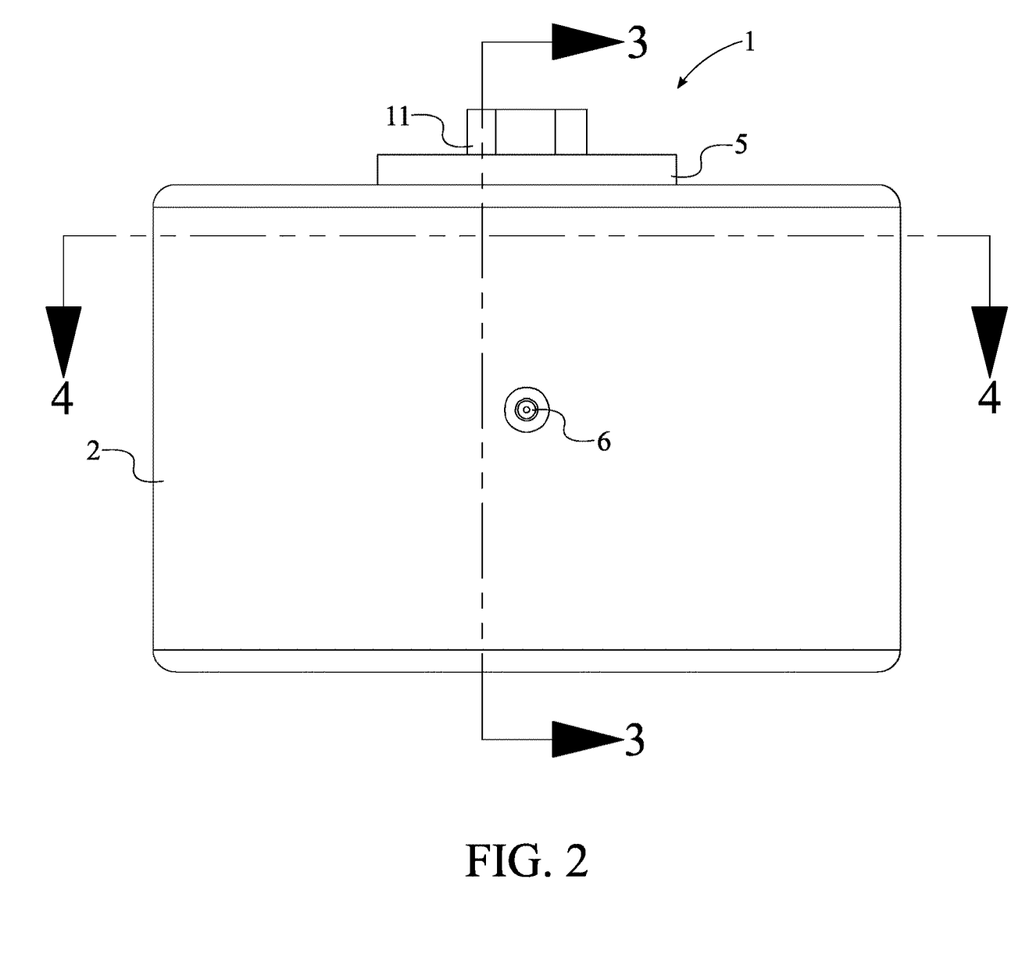
FIG. 2 is a side view of the first embodiment of the present invention.

With reference to FIG. 1, the present invention may further comprise a locking mechanism 5 that is used to lock the handle 11 in place. The handle 11 is rotatably connected to the cranking mechanism 1. The locking mechanism 5 is operatively integrated into the connection between the handle 11 and the cranking mechanism 1, wherein the locking mechanism 5 is used to lock the handle 11 in discrete positions. The locking mechanism 5 can be any type of securement device such as, but not limited to, a clamp, a fastener, or an electronic lock. In one embodiment of the present invention, the locking mechanism 5 is a shaft lock mechanism. The shaft lock mechanism includes a shaft collar and a set screw. The shaft collar is mounted between the drive shaft 12 and handle 11 of the cranking mechanism 1. The set screw is integrated into the shaft collar. Through fastening of the set screw, the set screw will contact the drive shaft 12 which prevents the drive shaft 12 from being rotated, and therefore locking the handle 11 in place.

Figure 5:
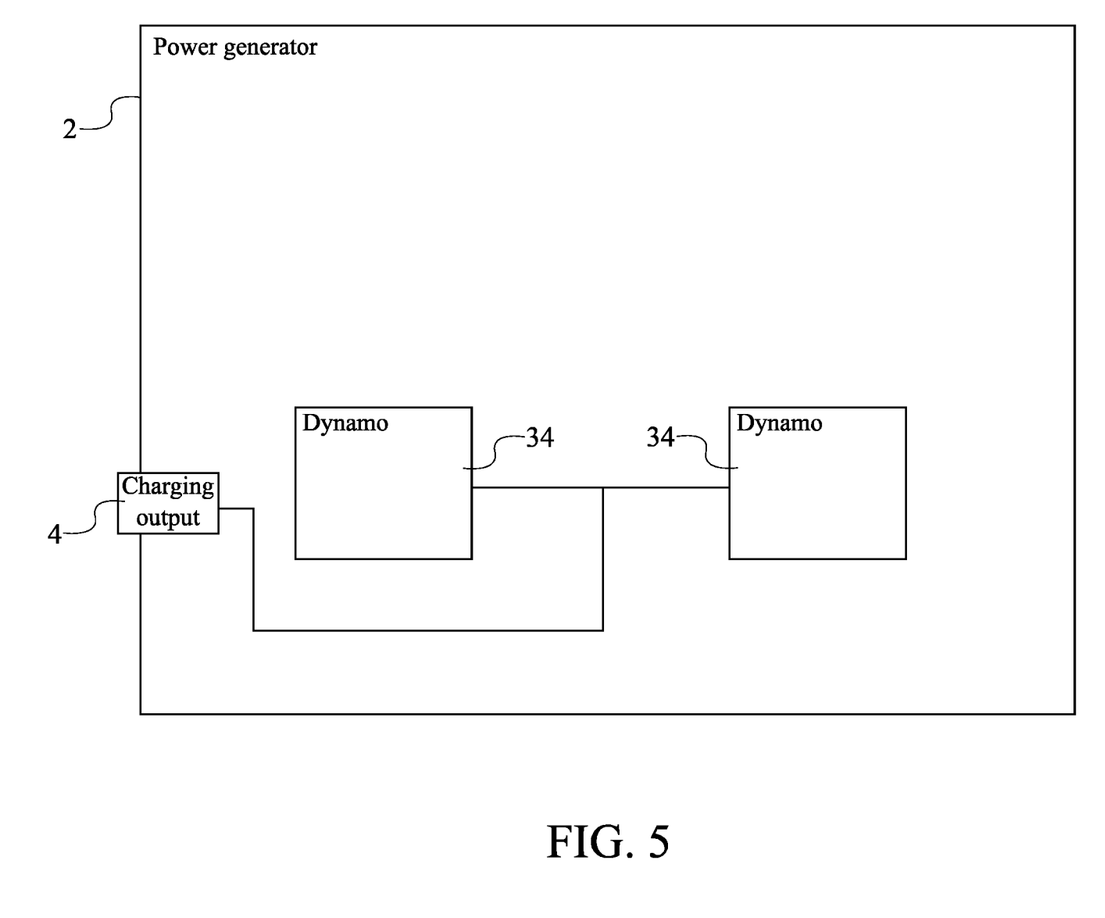
FIG. 5 is a schematic diagram illustrating the electrical connections of the present invention.

With reference to FIG. 5 and in a first embodiment of the present invention, the charging output 4 is a power cord that is used to transfer electrical energy from the present invention to any electrically-powered device. The power cord is externally tethered to the casing 2. This arrangement allows the user to easily access the power cord. The power cord may be any type of power output such as, but not limited to, a USB port output or a DC output.

In a second embodiment of the present invention, the charging output 4 is an induction coil that is used to wirelessly transfer power from the present invention to any electrically-powered device. In more detail, the induction coil allows the present invention to electromagnetically charge or power any electrically-powered device. The induction coil is internally situated onto the casing 2. This arrangement protects and conceals the induction which prevents any damage to the wireless power transfer capability of the present invention.

In another embodiment of the present invention, the charging output 4 may further comprise a power regulator. The power regulator may be any type of circuit regular device such as, but not limited to, a voltage regulator or a current regulator. The power regular may be integrated within the charging output 4. The power regulator provides a safety feature to the present invention in order to prevent the overcharging of a device electrically connected to the present invention. Moreover, this prevents any overheating or possible combustion of the battery of the device electrically connected to the present invention.

Figure 6:
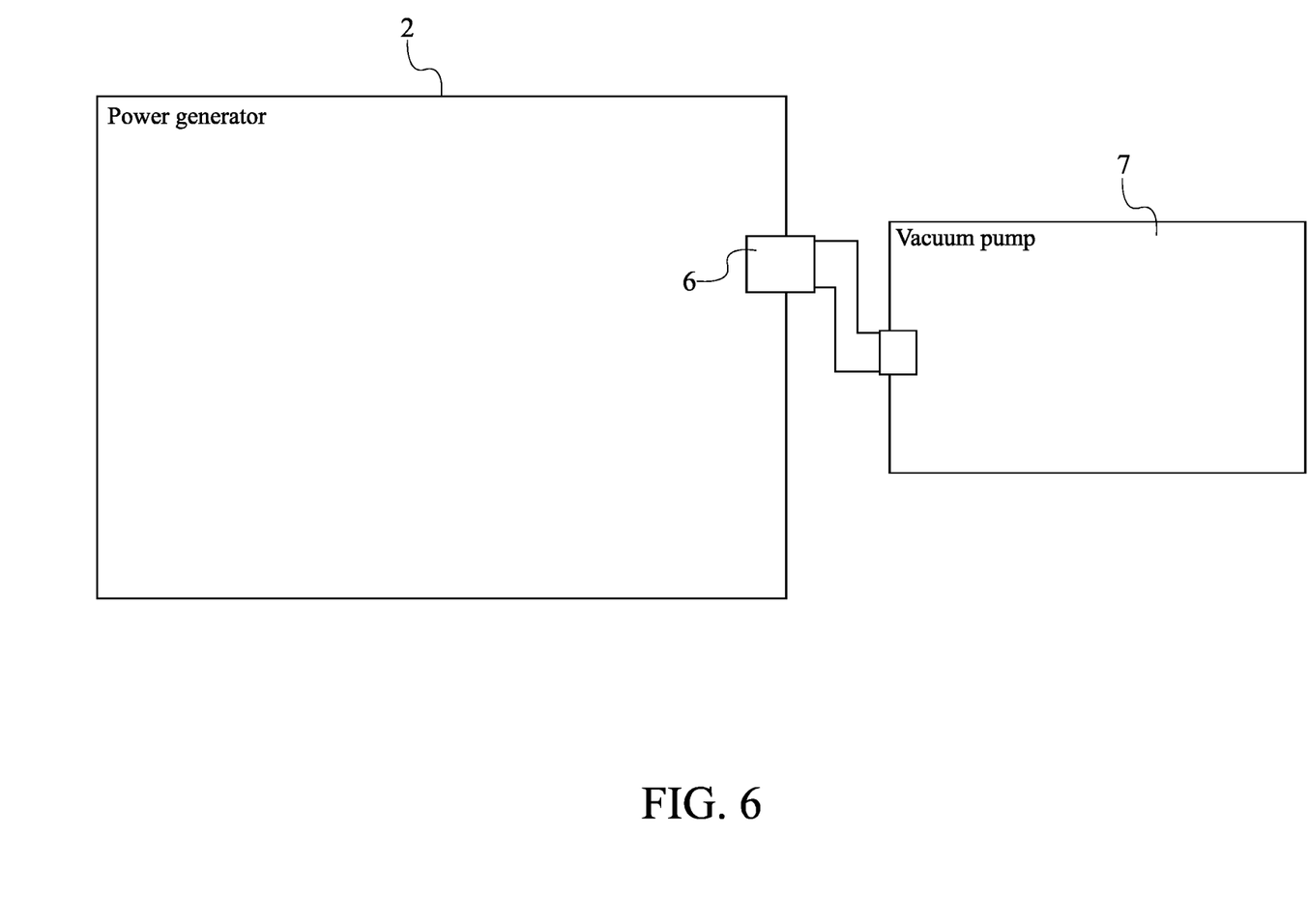
FIG. 6 is schematic diagram illustrating the vacuum pump being used remove air from the power generator.

In order for present invention to function at the highest efficiency, the casing 2 is a hermetically-sealed enclosure to prevent any friction between air molecules and the at least one energy-converting mechanism 3. With reference to FIG. 1, the present invention may further comprise an air valve 6 that allows a user to remove any air inside the casing 2 to improve the efficiency of the at least one energy-converting mechanism 3. The air valve 6 is in fluid communication with the casing 2. This arrangement allows the air valve 6 to release any air that is accumulated inside the casing 2. The air valve 6 is preferably a one-way valve to prevent the user from accidentally leaking unwanted air inside the casing 2. Furthermore, the hermetically-sealed enclosure is a vacuum chamber. In further detail, the inside of the casing 2 is preferably vacuumed during the manufacture process to remove any air for the highest efficiency of the present invention. With reference to FIG. 6, the present invention may further comprise a vacuum pump 7 that allows a user to manually remove air from inside the casing 2. The vacuum pump 7 is in fluid communication with the air valve 6. This arrangement allows the user to remove air from inside the casing 2 through the air valve 6 with the vacuum pump 7.

Figure 7:
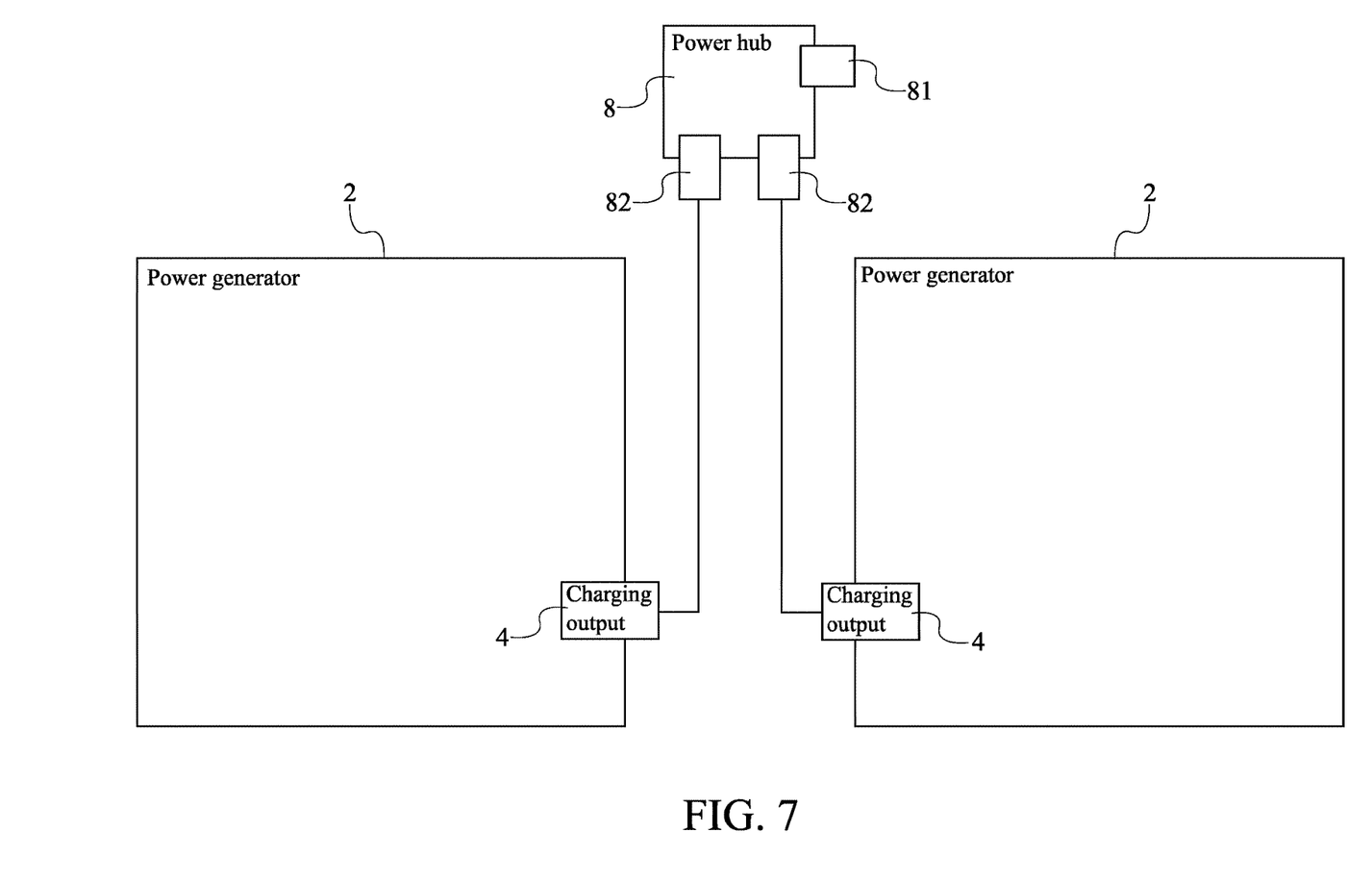
FIG. 7 is a schematic diagram illustrating the power hub being used to connect one or more power generators.

With reference to FIG. 7, the present invention may further comprise a power hub 8 that is used to connect multiple of the present invention in order to charge or power a device that requires a substantial amount of electrical energy. In further detail, multiple of same invention can be connected in a daisy chain style, through the power hub 8, in order to charge or power a device that requires a substantial amount of electrical energy. The power hub 8 comprises at least one hub output 81 and a plurality of hub inputs 82. The power hub 8 is externally positioned to the casing 2. The at least one hub output 81 is used to charge or power any electrically-powered device. The plurality of hub inputs 82 allows the user to connect an arbitrary present invention to the power hub 8. The charging output 4 is electrically connected to an arbitrary input from a plurality of hub inputs 82 and each of the plurality of hub inputs 82 is electrically connected to the at least one hub output 81. This arrangement ensures that the at least one hub output 81 is able provide the electrical energy provided by any number of present inventions connected to the power hub 8.

In another embodiment of the present invention, the present invention may further comprise a dampener device. The dampener device may be any kinetic energy dampening device which is able to dampen the unwinding the spring 31. The dampener device may be positioned within the tubular housing 9. Furthermore, the dampener device may be positioned between the drive shaft 12 and the spring 31 in order to properly dampen the unwinding of the spring 31. The dampener device provides a safety feature to the present invention in order to prevent the overcharging of the device electrically connected to the present invention.

In the preferred embodiment of the present invention, the generated electrical energy includes an alternating current. In order for the generated electrical energy to include an alternating current, the plurality of dynamos 34 is configured with magnets. The magnets must be in a north-south horizontal configuration with accordance to a corresponding dynamo.

In the preferred embodiment of the present invention, the drive shaft 12, the spring 31, the sun gear 32, the plurality of planetary gears 33, and the plurality of dynamos 34 are coated with Teflon material in order to prevent these components from rusting and from needing lubrication maintenance.

In another embodiment of the present invention, the present invention may be embedded inside of a mobile device or similar device. In this embodiment, the charging output 4 is electrically connected to the battery of the user device in order to charge said battery. Additionally, the handle 11 is positioned external to the device housing in order for the user to crank the handle 11 in order to generate electrical energy.

Although the invention has been explained in relation to its preferred embodiment, it is to be understood that many other possible modifications and variations can be made without departing from the spirit and scope of the invention as hereinafter claimed.

What is claimed is:

1. A power generator comprising:
a cranking mechanism;
a casing;
at least one energy-converting mechanism;
a charging output;
the cranking mechanism comprises a handle and a drive shaft;
the at least one energy-converting mechanism comprises a spring, a sun gear, a plurality of planetary gears, and a plurality of dynamos;
the spring comprises a first spring end and a second spring end;
the at least one energy-converting mechanism being mounted within the casing;
the drive shaft traversing into the casing;
the drive shaft being rotatably mounted to the casing;
the handle being positioned external to the casing;
the handle being terminally and torsionally connected to the drive shaft;
the first spring end being torsionally connected to the drive shaft, offset from the handle;
the second spring end being mounted within the housing;
the sun gear being torsionally connected to the drive shaft;
the sun gear being positioned in between the handle and the spring;
the plurality of planetary gears being engaged around the sun gear;
each of the plurality of planetary gears being torsionally connected to a corresponding dynamo from the plurality of dynamos; and
the charging output being electrically connected to the plurality of dynamos.

2. The power generator as claimed in claim 1 comprising:
a tubular housing;
the tubular housing comprises a first closed end and a second closed end;
the drive shaft hermetically traversing through the first closed end;
the spring being positioned within the tubular housing;
the second spring end being fixed to the second closed end; and
the second closed end being fixed to the casing.

3. The power generator as claimed in claim 2 comprising:
the tubular housing being centrally positioned to the casing.

4. The power generator as claimed in claim 2 comprising:
the tubular housing being a hermetically-sealed enclosure; and
the hermetically-sealed enclosure being a vacuum chamber.

5. The power generator as claimed in claim 1 comprising:
a locking mechanism;
the handle being rotatably connected to the cranking mechanism; and
the locking mechanism being operatively integrated into the connection between the handle and the cranking mechanism, wherein the locking mechanism is used to lock the handle in discrete positions.

6. The power generator as claimed in claim 1 comprising:
the charging output being a power cord; and
the power cord being externally tethered to the casing.

7. The power generator as claimed in claim 1 comprising:
the charging output being an induction coil; and
the induction coil being internally situated onto the casing.

8. The power generator as claimed in claim 1 comprising:
the casing being a hermetically-sealed enclosure;
an air valve; and
the air valve being in fluid communication with the casing.

9. The power generator as claimed in claim 8 comprising:
the hermetically-sealed enclosure being a vacuum chamber;
a vacuum pump; and
the vacuum pump being in fluid communication with the air valve.

10. The power generator as claimed in claim 1 comprising:
a power hub;
the power hub comprises at least one hub output and a plurality of hub inputs;

the power hub being externally positioned to the casing;

the charging output being electrically connected to an arbitrary input from the plurality of hub inputs; and each of the plurality of hub inputs being electrically connected to the at least one hub output.

11. A power generator comprising:

a cranking mechanism;

a casing;

at least one energy-converting mechanism;

a charging output;

a tubular housing;

the cranking mechanism comprises a handle and a drive shaft;

the at least one energy-converting mechanism comprises a spring, a sun gear, a plurality of planetary gears, and a plurality of dynamos;

the spring comprises a first spring end and a second spring end;

the at least one energy-converting mechanism being mounted within the casing;

the drive shaft traversing into the casing;

the drive shaft being rotatably mounted to the casing;

the handle being positioned external to the casing;

the handle being terminally and torsionally connected to the drive shaft;

the first spring end being torsionally connected to the drive shaft, offset from the handle;

the sun gear being torsionally connected to the drive shaft;

the sun gear being positioned in between the handle and the spring;

the plurality of planetary gears being engaged around the sun gear;

each of the plurality of planetary gears being torsionally connected to a corresponding dynamo from the plurality of dynamos;

the charging output being electrically connected to the plurality of dynamos;

the tubular housing comprises a first closed end and a second closed end;

the drive shaft hermetically traversing through the first closed end;

the spring being positioned within the tubular housing;

the second spring end being fixed to the second closed end; and the second closed end being fixed to the casing.

12. The power generator as claimed in claim 11 comprising:

the tubular housing being centrally positioned to the casing.

13. The power generator as claimed in claim 11 comprising:

the tubular housing being a hermetically-sealed enclosure; and the hermetically-sealed enclosure being a vacuum chamber.

14. The power generator as claimed in claim 11 comprising:

a locking mechanism;

the handle being rotatably connected to the cranking mechanism; and the locking mechanism being operatively integrated into the connection between the handle and the cranking mechanism, wherein the locking mechanism is used to lock the handle in discrete positions.

15. The power generator as claimed in claim 11 comprising:

the charging output being a power cord; and the power cord being externally tethered to the casing.

16. The power generator as claimed in claim 11 comprising:

the charging output being an induction coil; and the induction coil being internally situated onto the casing.

17. The power generator as claimed in claim 11 comprising:

the casing being a hermetically-sealed enclosure;

an air valve; and the air valve being in fluid communication with the casing.

18. The power generator as claimed in claim 17 comprising:

the hermetically-sealed enclosure being a vacuum chamber;

a vacuum pump; and the vacuum pump being in fluid communication with the air valve.

19. The power generator as claimed in claim 11 comprising:

a power hub;

the power hub comprises at least one hub output and a plurality of hub inputs;

the power hub being externally positioned to the casing;

the charging output being electrically connected to an arbitrary input from the plurality of hub inputs; and each of the plurality of hub inputs being electrically connected to the at least one hub output.

* * * * *